(12) United States Patent
Si et al.

(10) Patent No.: US 12,152,196 B2
(45) Date of Patent: Nov. 26, 2024

(54) CONTINUOUS SOLID ORGANIC MATTER PYROLYSIS POLYGENERATION SYSTEM AND METHOD FOR USING SAME

(71) Applicant: Engergy Research Institute of Shandong Academy of Sciences, Jinan (CN)

(72) Inventors: Hongyu Si, Jinan (CN); Bing Wang, Jinan (CN); Xiaohui Liang, Jinan (CN); Suxiang Liu, Jinan (CN); Meirong Xu, Jinan (CN); Yonggang Li, Jinan (CN); Zhaojie Cui, Jinan (CN); Qiang Yao, Jinan (CN); Haichao Wang, Jinan (CN); Laizhi Sun, Jinan (CN); Shuangxia Yang, Jinan (CN); Likun He, Jinan (CN); Dongliang Hua, Jinan (CN); Zhijie Gu, Jinan (CN)

(*) Notice: Subject to any disclaimer, the term of this patent is extended or adjusted under 35 U.S.C. 154(b) by 0 days.

(21) Appl. No.: 17/744,619

(22) PCT Filed: Jan. 14, 2021

(86) PCT No.: PCT/CN2021/070121
§ 371 (c)(1),
(2) Date: May 13, 2022

(87) PCT Pub. No.: WO2022/141624
PCT Pub. Date: Jul. 7, 2022

(65) Prior Publication Data
US 2024/0166951 A1     May 23, 2024

(51) Int. Cl.
*C10B 47/46*     (2006.01)
*B01D 3/14*     (2006.01)
(Continued)

(52) U.S. Cl.
CPC .............. *C10B 47/28* (2013.01); *B01D 3/143* (2013.01); *B01D 53/265* (2013.01); *C10B 21/12* (2013.01);
(Continued)

(58) Field of Classification Search
CPC . C10B 47/28–48; C10B 57/005; C10B 57/10; C10B 47/46
See application file for complete search history.

(56) References Cited

U.S. PATENT DOCUMENTS

| 4,247,367 A | * | 1/1981 | Reilly | ..................... C10B 53/00 |
| | | | | 202/217 |
| 5,302,254 A | * | 4/1994 | Martin | .................... C10L 9/083 |
| | | | | 202/226 |

(Continued)

FOREIGN PATENT DOCUMENTS

| CN | 101845331 A | * | 9/2010 |
| CN | 102476129 A | * | 5/2012 |

(Continued)

OTHER PUBLICATIONS

PE2E translation of CN-101845331-A.*
(Continued)

*Primary Examiner* — Jonathan Luke Pilcher

(57) ABSTRACT

A continuous solid organic matter pyrolysis polygeneration system and method for using the system is disclosed. The pyrolysis polygeneration system mainly includes a processing system, a drying furnace, a pyrolysis furnace, a cooling furnace, a tail gas treatment system, and a gas treatment system and a protective gas circulation system cooperate with each other to realize the multi-level rational utilization of energy, and are suitable for the continuous and rapid pyrolysis and carbonization of various solid organic matter in the actual production. While realizing the polygeneration
(Continued)

of coke, wood vinegar and tar, the maximum utilization of overall heat is realized through process optimization.

9 Claims, 1 Drawing Sheet

(51) Int. Cl.
  *B01D 53/26* (2006.01)
  *C10B 21/12* (2006.01)
  *C10B 21/18* (2006.01)
  *C10B 27/06* (2006.01)
  *C10B 39/02* (2006.01)
  *C10B 47/28* (2006.01)
  *C10B 57/10* (2006.01)
  *C10C 1/00* (2006.01)
  *C10C 5/00* (2006.01)

(52) U.S. Cl.
  CPC .............. *C10B 21/18* (2013.01); *C10B 27/06* (2013.01); *C10B 39/02* (2013.01); *C10B 47/46* (2013.01); *C10B 57/10* (2013.01); *C10C 1/00* (2013.01); *C10C 5/00* (2013.01); *B01D 2257/80* (2013.01); *B01D 2258/0283* (2013.01); *B01D 2259/65* (2013.01)

(56) References Cited

U.S. PATENT DOCUMENTS

| | | | | |
|---|---|---|---|---|
| 5,678,496 | A * | 10/1997 | Buizza | C10B 53/00 110/255 |
| 6,168,688 | B1 * | 1/2001 | Clot | C10B 7/14 201/37 |
| 6,332,909 | B1 * | 12/2001 | Teshima | C10B 7/14 75/693 |
| 7,416,641 | B2 * | 8/2008 | Denison | C10B 53/07 202/99 |
| 9,309,465 | B2 * | 4/2016 | Kozuru | F26B 3/08 |
| 11,331,831 | B2 * | 5/2022 | Alvarez Quintana | C10B 47/30 |
| 2002/0117388 | A1 * | 8/2002 | Denison | C10G 31/09 201/3 |
| 2004/0024279 | A1 * | 2/2004 | Mason | F23G 5/0276 588/317 |
| 2009/0321317 | A1 * | 12/2009 | Widmer | C10G 1/10 422/198 |
| 2015/0175891 | A1 * | 6/2015 | Kozuru | F26B 23/028 201/16 |

FOREIGN PATENT DOCUMENTS

| | | | | |
|---|---|---|---|---|
| CN | 104974773 | A | * | 10/2015 |
| CN | 105062528 | A | * | 11/2015 |
| CN | 105087025 | A | * | 11/2015 |
| CN | 105273731 | A | * | 1/2016 |
| CN | 105505475 | A | * | 4/2016 |
| CN | 105623689 | A | * | 6/2016 |
| CN | 106433799 | A | * | 2/2017 |
| CN | 106635083 | A | * | 5/2017 |
| CN | 109666501 | A | * | 4/2019 | ............... C10G 1/00 |
| EP | 3425277 | A1 | * | 1/2019 | ........... B09B 3/0083 |
| WO | WO-9733703 | A1 | * | 9/1997 | ............... B09B 3/00 |
| WO | WO-9816593 | A1 | * | 4/1998 | ............ C10B 53/00 |
| WO | WO-9816594 | A1 | * | 4/1998 | ............ C10B 53/00 |

OTHER PUBLICATIONS

PE2E translation of CN-102476129-A.*
PE2E translation of CN-106433799-A.*
PE2E translation of CN-106635083-A.*
PE2E translation of CN-109666501-A.*
PE2E translation of CN-104974773-A.*
PE2E translation of CN-105062528-A.*
PE2E translation of CN-105087025-A.*
PE2E translation of CN-105273731-A.*
PE2E translation of CN-105505475-A.*
PE2E translation of CN-105623689-A.*
PE2E translation of EP 3425277.*

* cited by examiner

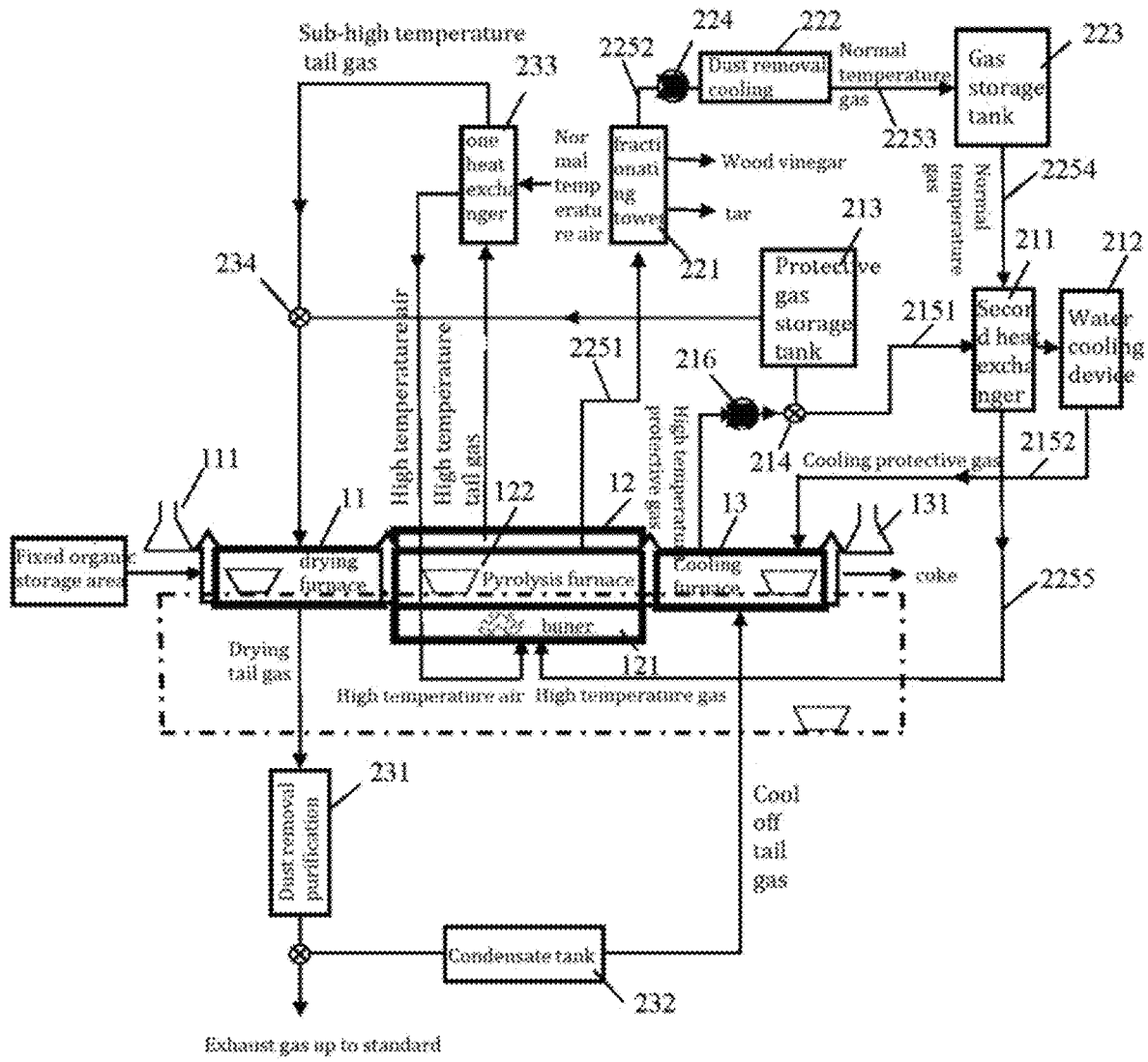

CONTINUOUS SOLID ORGANIC MATTER PYROLYSIS POLYGENERATION SYSTEM AND METHOD FOR USING SAME

This patent application is a continuation application of PCT/CN2021/070121, filed on Jan. 4, 2021, the disclosure of which is incorporated by reference herein in its entirety as part of the present application.

TECHNICAL FIELD

The present disclosure relates to the technical field of renewable energy, in particular to a continuous solid organic matter pyrolysis polygeneration system and a method for using the system.

BACKGROUND ART

With the development of economy and society, the treatment of solid organic matter, represented by agricultural and forestry wastes and municipal sludge, has become a bottleneck problem that restricts the development of circular economy. At the same time, with the development of industry and the progress of life, the demand for coke is increasing. Because the utilization value of solid organic matter is low, the market operation is difficult, and the treatment method should not be too complicated, so it should be treated with low cost, high efficiency and high value output. The pyrolytic process has become an important way to solve this problem. In the traditional process, the pyrolysis process of solid organic matter is usually realized by an earthen kiln or a closed pyrolysis kettle. The environmental pollution in the pyrolysis process of kiln is serious, and the yield is not high because it is not completely closed. In addition, although the pyrolysis kettle can realize the anaerobic pyrolysis, the carbon quality and the yield are guarantee, but the production efficiency is not high because the material in and out of the pyrolysis kettle requires complicate opening and closing procedures and long-time seal cooling. In the present research, gasification and pyrolysis are two main carbonization processes. Although all of them can achieve the goal of carbonization of solid organic matter, there are some limitations. Chinese applications CN201510812456.2, CN201510570841.0, CN201610193056.2, CN201510562463.1, CN201610067158.X. CN201502919800.X and CN201410029216.0 are all based on the carbonization of powder, which requires the addition of binder after carbonization to meet the demand of block carbon. Although the application CN201502919800.X discloses a pyrolysis process, there is no matching device, and safety problems and efficiency problems lack solutions. The application CN201610881169.1 is carbonized by rotary furnace, the process can not keep the shape of original wood, can not realize continuous production, and is indirectly cooled by water circulation with low efficiency.

How to realize the pyrolytic carbonization of solid organic matter with large size, high efficiency, safety and low cost through system design and method optimization is the key to realize the process landing and the problem to be solved urgently in this field.

SUMMARY

A continuous solid organic matter pyrolysis polygeneration system and method for using the system is disclosed.

In order to achieve the above objective, the present disclosure adopts the following technical scheme.

A continuous solid organic matter pyrolysis polygeneration system, including: a processing system, wherein the processing system includes a drying furnace, a pyrolysis furnace and a cooling furnace; the pyrolysis furnace is divided into two independent spaces, a burner and a pyrolysis chamber respectively, wherein the pyrolysis furnace further includes an auxiliary system.

The auxiliary system includes a tail gas treatment system.

The tail gas treatment system includes a dust removal and purification device and a condensation tank.

The burner is communicated with the drying furnace, the drying furnace is communicated with the dust removal, the dust removal is communicated with the condensation tank and the condensation tank cooling furnace.

The drying furnace, the pyrolysis furnace and the cooling furnace are sequentially connected end to end.

The tunnel length of that drying furnace, the pyrolysis furnace and the cooling furnace are equal.

Circular rails are laid in the drying furnace, the pyrolysis furnace and the cooling furnace.

The annular track is an annular double track.

The left inlet of the drying furnace is connected with a local exhaust device, the right outlet is connected with the inlet of the pyrolysis furnace, a seal hatch door is arranged at the connection.

The right outlet of that pyrolysis is connected with the left inlet of the cooling furnace, and a sealed cabin door is arranged at the connection.

The right outlet of the cooling furnace is connected with a local exhaust device, and a sealed cabin door is arranged at the connection.

The pipeline between the dust removal and purification device and the condensation tank is provided with a valve.

Beneficial effect: after reaching the standard, the tail gas can be discharged through the valve to reduce the pressure in the system appropriately.

The tail gas treatment system further includes a first heat exchanger, and the first heat exchanger is respectively communicated with the burner and the drying furnace.

The auxiliary system further includes a gas treatment system, wherein the gas treatment system includes a fractionating tower and a dust removal cooling device; the fractionation tower is respectively communicated with the pyrolysis chamber and the dust removal cooling device, and the dust removal cooling device is communicated with the burner.

The gas treatment system further includes a gas storage tank, wherein the gas storage tank is respectively connected with the dust removal cooling device and the burner.

The gas treatment system further includes a first fan, and the first fan is arranged on a gas transport pipeline.

The protective gas pipeline is a pipeline that connects each device of the gas processing system.

Beneficial effects: opening the fan can speed up the flow of gas from the fractionating tower to the dust removal cooling device.

The auxiliary system also includes a protective gas circulation system; the protective gas circulation system comprises a water cooling device; two end of the water cooling device are respectively communicated with the cooling furnace.

The protective gas circulation system also comprises a second heat exchanger; one path of the second heat exchanger is respectively communicated with the cooling furnace and the water cooling device, and the water cooling device is communicated with the cooling furnace; the other path of the second heat exchanger is respectively communicated with the gas storage tank and the burner.

A fan is arranged in the pipeline communication between the cooling furnace and the heat exchanger.

Beneficial effect: opening the fan can accelerate the gas flow rate of the cooling furnace to the second heat exchanger.

The protective gas circulation system further includes a protective gas storage tank; a first valve is arranged between the first heat exchanger and the drying furnace, a second valve is arranged between the cooling furnace and the second heat exchanger, and one end of the protective gas storage tank is communicated with the first valve, and the other end is communicated with the second valve.

One end of the protective gas storage tank is communicated with the first valve, and the other end is communicated with the second valve.

The protective gas circulation system further includes a valve, and the valve is arranged in the protective gas transportation pipeline.

The protective gas pipeline is a pipeline that communicates each device of the protective gas circulation system.

Beneficial effects: the valve can control the intake and storage conditions of the protective gas storage tank, and buffer properly according to the air pressure in the system.

A method for using a continuous solid organic matter pyrolysis polygeneration system, including the following steps.

S1: Putting a collected solid organic matter into a material truck from a solid organic matter temporary storage area, transporting to a drying furnace through the material truck, and performing a direct contact drying on the solid organic matter by a secondary high temperature tail gas from the tail gas treatment system in the drying furnace, wherein, after drying, the water content of the solid organic matter decreases to below 10%, then sending the solid organic matter to the pyrolysis furnace.

S2: Combusting a high-temperature gas and high-temperature air in the burner of the pyrolysis furnace to heat the pyrolysis chamber to a high temperature; pyrolyzing a solid organic matter in the pyrolysis chamber for 1-10 h in an anaerobic manner, the pyrolysis gas phase enters the gas treatment system, and the solid phase is coke; the high-temperature tail gas generated by combustion of high-temperature gas and high-temperature air enters the tail gas treatment system.

S3: Sending the coke obtained in step S2 into a cooling furnace, and obtaining a coke product when the temperature of the coke is reduced from the highest temperature to below 150±10° C.

S4: Separating the pyrolysis gas phase passed through step S2 in a fractionation tower into a non-condensable gas, a wood vinegar liquid and a tar, and fractionating the wood vinegar liquid and the tar to become a final product.

S5: The non-condensable gas obtained in step S4 enters the dust removal cooling device, and the obtained normal temperature gas enters the gas storage tank.

S6: Heat-exchanging the normal temperature gas in the gas storage tank obtained in step S5 with the high temperature protection gas through the second heat exchanger to obtain a high temperature gas.

S7: Mixing the high-temperature gas obtained in step S6 with the high-temperature air and then entering a burner for combustion, and the obtained high-temperature tail gas enters an exhaust gas treatment system.

S8: Heat-exchanging the high temperature tail gas obtained in step S7 with normal temperature air through the first heat exchanger to obtain a sub-high temperature tail gas.

S9: Sending the sub-high temperature tail gas obtained in step S8 to a drying furnace for direct contact drying of solid organic matter to obtain a dry tail gas.

S10: Sending the dry tail gas obtained in step S9 to a dust removal and purification device, and discharging one part of the dust removed and purified tail gas as the standard tail gas directly, and condensing and dehumidifying the other part by a condensing tank to obtain cooled tail gas.

S11: The cooling off gas obtained in step S10 enters the cooling furnace, reacting with the combustible in the furnace for oxidation to remove residual oxygen to obtain a protective gas.

S12: Cooling the coke with the protective gas obtained in step S11 by direct contact; the obtained high-temperature protection gas enters the second heat exchanger through the fan to heat-exchange with the normal-temperature gas, and when the cooling efficiency is low, supplementing the water cooling device to cool the high-temperature protection gas, sending the obtained cooling protection gas to the cooling furnace to form a circulation circuit; when the protective gas pressure is insufficient, the cooling tail gas enters the cooling furnace to supplement the protective gas; when the pressure inside the protective gas storage tank is insufficient, injecting part of the protective gas into the protective gas storage tank as the protective gas when opening the hatch.

To sum up, the present disclosure provide a continuous solid organic matter pyrolysis polygeneration system and a method for using the system, and has the following beneficial effects.

1. In the production line and the process, a drying furnace, a pyrolysis furnace and a cooling furnace are connected end to end, an annular track is arranged inside and outside the furnace, and high-efficiency continuous production and automatic operation can be realized; the pyrolysis product of the solid organic matter is directly separated at high temperature, so that the energy consumption cause by first storing and then separating is avoided, the production line of wood vinegar, tar, combustible gas and coke was realized by gas-liquid separation system of pyrolysis products.

2. Through the heat exchange between high-temperature tail gas and normal-temperature air and between high-temperature protective gas and normal-temperature gas, the cascade utilization of heat is realized, and the energy utilization efficiency of the whole process is improved; the high-temperature tail gas after combustion is used for direct contact drying of raw materials, and the cooling tail gas is used as protective gas for direct contact cooling of coke, which realizes the recycling of tail gas and effectively improves the drying efficiency and cooling efficiency.

3. When the sealed cabin door is opened, the protective gas in the protective gas storage tank is input into the drying furnace or cooling furnace, and the exhaust fan behind the fractionator pumps out the gas in the pyrolysis furnace, keeping the slight positive pressure in the cooling furnace or drying furnace and the slight negative pressure in the pyrolysis furnace, at the same time, the partial air exhaust devices at both ends of the furnace body discharge the air leakage in the furnace, thus avoiding the contact between the air and the combustible components in the furnace and ensuring the safety production.

To sum up, the whole production line and process have high production efficiency and energy utilization rate, and it is easy to realize automatic operation; without external energy, energy can be self-sufficient; only when the cooling effect of the cooling furnace is not good, part of the water source needs to enter the water cooling device as protective gas cooling water, which consumes less other substances and energy except raw materials; there are no other emissions except the exhaust emission and dry condensed water that meet the standards, and the two emissions are easy to clean and control. The continuous solid organic pyrolysis polygeneration production line and the process provided by the disclosure have broad application prospects and market prospects.

BRIEF DESCRIPTION OF THE DRAWINGS

In order to more clearly explain the embodiment of the disclosure or the technical scheme in the prior art, the following will briefly introduce the drawings needed in the description of the embodiment or the prior art, obviously, the drawings in the following description are only the embodiment of the disclosure, and for ordinary technicians in the field, other drawings can be obtained according to the provided drawings without paying creative efforts.

The sole FIGURE is a model diagram of a continuous solid organic matter pyrolysis polygeneration system provided by the present disclosure.

DETAILED DESCRIPTION OF THE EMBODIMENTS

The following will clearly and completely describe the technical scheme in the embodiment of the disclosure with reference to the drawings in the embodiment of the disclosure, obviously, the described embodiment is only a part of the embodiment of the disclosure, not all the embodiments. Based on the examples in this disclosure, all other examples obtained by ordinary technicians in this field without creative work are within the scope of protection of this disclosure.

Embodiment 1

A continuous solid organic matter pyrolysis polygeneration system includes a processing system 1 and an auxiliary system, wherein the processing system includes a drying furnace 11, a pyrolysis furnace 12 and a cooling furnace 13; the pyrolysis furnace 12 is divided into two independent spaces, a burner 121 and a pyrolysis chamber 122 respectively.

Further includes an auxiliary system 2, the auxiliary system 2 includes a tail gas treatment system; the tail gas treatment system includes a dust removal and purification device 231 and a condensation tank 232; the burner 121 is communicated with the drying furnace 11, the drying furnace 11 is communicated with the dust removing and purification device 231, the drying furnace 11 communicates with the dust removing and purification device 231, the dust removing and purification device 231 is communicated with the condensing tank 232, and the condensing tank 232 is communicated with the cooling furnace 13.

The inlet of the drying furnace 11 is provided with a local exhaust device 111, and the outlet of cooling furnace 13 is provided with a local exhaust device 131.

A drying furnace 11, a pyrolysis furnace 12 and a cooling furnace 13 are connected end to end in sequence; the tunnel lengths of the drying furnace 11, the pyrolysis furnace 12 and the cooling furnace 13 are equal; circular double rails are laid in the drying furnace 11, the pyrolysis furnace 12 and the cooling furnace 13; the left inlet of the drying furnace 11 is connected with a local exhaust device 111, and the right outlet is connected with the inlet of the pyrolysis furnace 12, and a sealed cabin door is arranged at the connection; the right outlet of the pyrolysis furnace 12 is connected with the left inlet of cooling furnace 13, and a sealed cabin door is arranged at the connection; the right outlet of the cooling furnace 13 is connected with a local exhaust device 131, and a sealed cabin door is arranged at the connection.

The tail gas treatment system further includes a heat exchanger 233 communicating with the burner 121 and the drying furnace 11, respectively.

The auxiliary system 2 further includes a gas treatment system; the gas treatment system includes a fractionating tower 221 and a dust removal cooling device 222, wherein the fractionating tower 221 is communicated with the pyrolysis chamber 122, the fractionating tower 221 is communicated with the dust removal cooling device 222, and the dust removal cooling device 222 is communicated with the burner 121.

The gas treatment system further includes a gas storage tank 223; the gas storage tank 223 is respectively communicated with the dust removal cooling device 222 and the burner 121.

The gas treatment system further includes a gas transportation pipeline 225, including a first pipeline 2251, a second pipeline 2252, a third pipeline 2253, a fourth pipeline 2254 and a fifth pipeline 2255.

The gas treatment system further includes a fan 224, and the fan is arranged on the first pipeline 2251, the second pipeline 2252, the third pipeline 2253, the fourth pipeline 2254 or the fifth pipeline 2255.

The auxiliary system 2 further includes a protective gas circulation system; the protective gas circulation system includes a water cooling device 212; two ends of the water cooling device 212 are respectively communicated with the cooling furnace 13.

The protective gas circulation system further includes a second heat exchanger 211.

The second heat exchanger 211 is connected with the cooling furnace 13 and the water cooling device 212, and the water cooling device 212 is connected with the cooling furnace 13; the other path of that second heat exchange 211 is respectively communicated with the gas storage tank 223 and the burner 121.

The protective gas circulation system also includes a protective gas storage tank 213; a valve 234 is communicated between the heat exchanger 233 and the drying furnace 11, and a valve 214 is communicated between the cooling furnace 13 and the second heat exchanger 211; one end of the protective gas storage tank 213 is communicated with the valve 234, and the other end is communicated with the valve 214.

The protective gas circulation system further includes a protective gas transport pipeline 215, wherein the protective gas transport pipeline 215 includes a first pipeline 2151 and a second pipeline 2152.

The protection gas circulation system further includes a fan 216 arranged on the first pipe 2151 or the second pipe 2152.

A method for using the continuous solid organic pyrolysis polygeneration system is described as follows.

The material truck is arranged on the circular track, stacking 0.5 m×1.5 m×4 m piles; the total number of truck is four, one material truck is loaded outside the furnace, and one material truck is in the drying furnace 11, the pyrolysis furnace 12 and the cooling furnace 13, and the annular track is of the double track type with a width of 1.0 m, the drying furnace 11, the pyrolysis furnace 12 and the cooling furnace 13 are connected in this order to form a closed loop inside and outside the furnace.

The circular track adopts the ramp track, so that the horizontal position of the drying furnace 11 is the highest, followed by the pyrolysis furnace 12, and the cooling furnace 13 is the lowest, and the material truck 1 is automatically propel on a rail by a slope, an automatic locking device is arranged between the material truck and the annular rail, automatically towing the truck outside the furnace back to the solid organic matter temporary storage area for loading.

The drying furnace 11, the pyrolyzing furnace 12, and the cooling furnace 13 are cubic tunnels with a cross-section of 1.5 m×2.5 m and a total length of 30 m, and the three furnace-body tunnels are equal in length when the production line runs, and the three furnaces are mutually independent and work in a closed manner.

Two sides of the drying furnace 11 are provided with sealed cabin doors, a heat exchanger 233 and a protective gas storage tank 213 are connected to the upper part, and the gas flow rate is controlled by a valve 234; the left inlet is connected with a local exhaust device 111; the right outlet is connected with the inlet of the pyrolysis furnace 12.

The pyrolyzing furnace 12 is a double-layer sleeve type structure, two sides of which are provided with sealed cabin doors, and the pyrolyzing chamber 122 is connected to the fractionating tower 221; the burner 121 connects the first heat exchanger 233 and the second heat exchanger 211; the right outlet is connected to the left inlet of the cooling furnace 13.

Two sides of the cooling furnace are provided with sealed cabin doors, and the lower part is connected with a condensation tank 232; the upper part is connected with the protective gas storage tank 213 and the second heat exchanger 211; the right outlet is connected to a local exhaust device 112.

S1: The solid organic matter is preliminarily sorted manually, and is divided into agricultural and forestry waste excrement, plant straw, urban solid waste, domestic garbage and sludge. Putting the same kind of solid organic matter from the solid organic matter temporary storage area into the material truck; the protective gas in the protective gas storage tank 213 is sent to the drying furnace 11 to ensure a slight positive pressure in the furnace, the local exhaust device 111 and the closed door at the left entrance of the drying furnace 11 are opened, and the material truck is sent to the drying furnace 11 through the circular track, and the local exhaust device 111 and the closed door are closed, open the valve 234 to make the sub-high temperature tail gas enter the drying furnace for direct contact drying of solid organic matter. The temperature of tail gas is reduced from 250° C.±10° C. to about 100° C.±10° C., and the moisture content of solid organic matter is reduced to less than 10% after drying.

S2: Opening the closed door and the blower 224 at the left entrance of the pyrolysis furnace 12, feeding the solid organic matter passing through the step S1 into the pyrolysis furnace 12 from the material truck on the ring track, closing the closed door and the blower 224, high-temperature gas and high-temperature air are fed into a burn 121 of a pyrolysis furnace, and solid organic matter in that pyrolysis furnace is pyrolyze for 1-10 h in a high-temperature furnace at 350° C.-1000° C.' to form gas-solid two phases.

After the solid organic matter is pyrolyzed in the pyrolysis furnace, it is divided into two operations.

First Operation

S3: The protective gas in the protective gas storage tank 213 is sent to the cooling furnace 13 to ensure a slight positive pressure in the furnace, the closed door at the left entrance of the cooling furnace 13 is opened, and the pyrolytic solid phase, namely coke, is sent to the cooling furnace 13 by the hopper car on the circular track, and the cabin door is closed; the temperature of coke is reduced from the highest temperature to below 150±10° C.; open the local air exhaust device 131 and the closed door at the right outlet of the cooling furnace 13, and the material truck enters the outer annular rail of the furnace to discharge the coke to obtain the coke product.

Second Operation

S4: Separating the pyrolysis gas phase passed through step S2 in a fractionation tower 221 into a non-condensable gas, a wood vinegar liquid and a tar, and fractionating the wood vinegar liquid and the tar to become a final product.

S5: The non-condensable gas obtained in step S4 enters the dust removal cooling device 222, and the obtained normal temperature gas enters the gas storage tank 223.

S6: Heat-exchanging the normal temperature gas in the gas storage tank 223 obtained in step S5 with the high temperature protection gas through the second heat exchanger 221 to obtain a high temperature gas.

S7: Mixing the high-temperature gas obtained in step S6 with the high-temperature air and then entering a burner 121 for combustion, and the obtained high-temperature tail gas enters an exhaust gas treatment system.

S8: Heat-exchanging the high temperature tail gas obtained in step S7 with normal temperature air through the first heat exchanger 233 to obtain a sub-high temperature tail gas.

S9: Sending the sub-high temperature tail gas obtained in step S8 to a drying furnace 11 for direct contact drying of solid organic matter to obtain a dry tail gas.

S10: Sending the dry tail gas obtained in step S9 to a dust removal and purification device 231, and discharging one part of the dust removed and purified tail gas as the standard tail gas directly by valve, and condensing and dehumidifying the other part by a condensing tank 232 to obtain cooled tail gas.

S11: The cooling off gas obtained in step S10 enters the cooling furnace 13, reacting with the combustible in the furnace for oxidation to remove residual oxygen to obtain a protective gas.

S12: Cooling the coke with the protective gas obtained in step S11 by direct contact; the obtained high-temperature protection gas enters the second heat exchanger 211 through the fan 216 to heat-exchange with the normal-temperature gas, and when the cooling efficiency is low, supplementing the water cooling device 212 to cool the high-temperature protection gas, sending the obtained cooling protection gas to the cooling furnace 13 to form a circulation circuit; when the protective gas pressure is insufficient, the cooling tail gas enters the cooling furnace 13 to supplement the protective gas; when the pressure inside the protective gas storage tank 213 is insufficient, injecting part of the protective gas into the protective gas storage tank as the protective gas when opening the batch.

In this specification, each embodiment is described in a progressive manner, and each embodiment focuses on the differences from other embodiments, and the same similar parts among the embodiments may be referred to each other.

The foregoing description of the disclosed embodiments enables those skilled in the art to make or use the present disclosure. Various modifications to the above embodiments will be obvious to those skilled in the art, and the general principles defined herein can be implemented in other embodiments without departing from the spirit or scope of the present disclosure. Therefore, the present disclosure will not be limited to the embodiments shown herein, but should be accorded the widest scope consistent with the principles and novel features disclosed herein.

What is claimed is:

1. A continuous solid organic matter pyrolysis equipment, comprising:
    a processor,
    a plurality of material trucks and
    a closed-loop track, wherein the processor comprises a drying furnace, a pyrolysis furnace and a cooling furnace; wherein a first sealed cabin door is arranged at an inlet of the drying furnace, a second sealed cabin door is arranged between an outlet of the drying furnace and an inlet of the pyrolysis furnace, a third sealed cabin door is arranged between an outlet of the pyrolysis furnace and an inlet of the cooling furnace, and a fourth sealed cabin door is arranged at an outlet of the cooling furnace;
    the pyrolysis furnace is divided into two independent spaces, a burner and a pyrolysis chamber respectively, wherein the continuous solid organic matter pyrolysis equipment further comprises an auxiliary system,
    and the auxiliary system comprises a tail gas treatment system;
    the tail gas treatment system comprises a dust purifier and a condensation tank;
    the burner is in sequential fluid communication with the drying furnace, the dust purifier, the condensation tank and the cooling furnace;
    the plurality of material trucks are arranged on the closed-loop track; and
    a section of the closed-loop track that is positioned within the drying furnace, the pyrolysis furnace and the cooling furnace is ramped.

2. The equipment of claim 1, wherein the tail gas treatment system further comprises a first heat exchanger; and
    the first heat exchanger is in separate fluid communication with the burner and the drying furnace.

3. The equipment of claim 2, wherein the auxiliary system further comprises a gas treatment system, wherein the gas treatment system comprises a fractionating tower and a dust removal cooler; and
    the fractionation tower is in separate fluid communication with the pyrolysis chamber and the dust removal cooler, and the dust removal cooler is in fluid communication with the burner.

4. The equipment of claim 3, wherein the gas treatment system further comprises a gas storage tank, wherein the gas storage tank is in separate fluid communication with the dust removal cooler and the burner.

5. The equipment of claim 4, wherein the gas treatment system further comprises a first fan, and the first fan is arranged on a gas transport pipeline.

6. The equipment of claim 5, wherein the auxiliary system further comprises a protective gas circulator; and
    the protective gas circulator comprises a water cooler;
    two ends of the water cooler are respectively in separate fluid communication with the cooling furnace.

7. The equipment of claim 6, wherein the protective gas circulator further comprises a second heat exchanger;
    one path of the second heat exchanger is in separate fluid communication with the cooling furnace and the water cooler, and the water cooler is in fluid communication with the cooling furnace; and
    an other path of the second heat exchanger is in separate fluid communication with the gas storage tank and the burner.

8. The equipment of claim 7, wherein the protective gas circulator further comprises a protective gas storage tank;
    a first valve is arranged between the first heat exchanger and the drying furnace, a second valve is arranged between the cooling furnace and the second heat exchanger, and one end of the protective gas storage tank is in fluid communication with the first valve, and an other end is in fluid communication with the second valve;
    one end of the protective gas storage tank is in fluid communication with the first valve, and an other end is in fluid communication with the second valve.

9. The equipment of claim 6, wherein the protective gas circulator further comprises a second fan, the second fan is arranged on a protective gas transportation pipeline.

* * * * *